US010772149B2

(12) United States Patent
Xu

(10) Patent No.: US 10,772,149 B2
(45) Date of Patent: *Sep. 8, 2020

(54) METHOD AND SYSTEM FOR CONTROL OF DISCONTINUOUS RECEPTION (DRX) BY A MOBILE DEVICE IN A WIRELESS COMMUNICATIONS NETWORK

(71) Applicant: Huawei Technologies Co., Ltd., Shenzhen (CN)

(72) Inventor: Shugong Xu, Vancouver, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/196,609

(22) Filed: Nov. 20, 2018

(65) Prior Publication Data
US 2019/0090300 A1    Mar. 21, 2019

Related U.S. Application Data

(60) Continuation of application No. 15/620,340, filed on Jun. 12, 2017, now Pat. No. 10,154,524, which is a
(Continued)

(51) Int. Cl.
*H04W 76/28* (2018.01)
*H04W 72/12* (2009.01)
(Continued)

(52) U.S. Cl.
CPC .......... *H04W 76/28* (2018.02); *H04L 1/1812* (2013.01); *H04L 1/1858* (2013.01); *H04M 7/006* (2013.01);
(Continued)

(58) Field of Classification Search
None
See application file for complete search history.

(56) References Cited

U.S. PATENT DOCUMENTS

| 7,814,218 B1* | 10/2010 | Knee | H04L 69/18 |
| | | | 709/230 |
| 2002/0015408 A1* | 2/2002 | Rosier | H04L 1/1809 |
| | | | 370/392 |

(Continued)

FOREIGN PATENT DOCUMENTS

| CN | 1572077 A | 1/2005 |
| CN | 1980452 A | 6/2007 |

(Continued)

OTHER PUBLICATIONS

Samsung, "LTE uplink CQI report format", 3GPP TSG RAN WG1 Meeting #49-bis, R1-073107, Orlando, Jun. 25-29, 2007, 4 pages.
(Continued)

*Primary Examiner* — Shripal K Khajuria

(57) ABSTRACT

A method and system for controlling discontinuous reception (DRX) in a mobile device in a wireless communications network uses autonomous DRX control after initial VoIP traffic setup. If the mobile device transmits a negative-acknowledgement signal (NACK) indicating unsuccessful receipt of a VoIP packet, then it autonomously turns on a predetermined delay time later to receive the retransmission of the VoIP packet. The predetermined delay time is related to the time for the base station to process the NACK and prepare the VoIP packet for retransmission. When the mobile device transmits or retransmits a VoIP packet, reception is deactivated, but is autonomously activated the predetermined delay time later to receive an acknowledgement signal (ACK) or NACK. VoIP packets may be transmitted from the mobile device the predetermined delay time before VoIP packets are transmitted from the base station.

21 Claims, 5 Drawing Sheets

Related U.S. Application Data continuation of application No. 14/715,097, filed on May 18, 2015, now Pat. No. 9,717,113, which is a continuation of application No. 14/179,356, filed on Feb. 12, 2014, now Pat. No. 9,066,353, which is a continuation of application No. 13/012,668, filed on Jan. 24, 2011, now Pat. No. 8,724,547, which is a division of application No. 11/837,952, filed on Aug. 13, 2007, now Pat. No. 7,899,003.

(51) Int. Cl.
  *H04W 88/02* (2009.01)
  *H04L 1/18* (2006.01)
  *H04M 7/00* (2006.01)
  *H04W 52/02* (2009.01)

(52) U.S. Cl.
  CPC ... *H04W 52/0209* (2013.01); *H04W 72/1257* (2013.01); *H04W 88/02* (2013.01); *Y02D 70/00* (2018.01); *Y02D 70/1242* (2018.01); *Y02D 70/1262* (2018.01); *Y02D 70/23* (2018.01); *Y02D 70/24* (2018.01); *Y02D 70/25* (2018.01)

(56) References Cited

U.S. PATENT DOCUMENTS

| | | | |
|---|---|---|---|
| 2004/0148546 A1* | 7/2004 | Meyer | H04L 1/1678 714/18 |
| 2004/0176947 A1* | 9/2004 | Miyake | H04L 1/1883 704/201 |
| 2004/0224659 A1 | 11/2004 | Cheng | |
| 2005/0210122 A1* | 9/2005 | Taylor | H04L 29/06 709/218 |
| 2006/0013257 A1* | 1/2006 | Vayanos | H04L 69/40 370/473 |
| 2006/0089169 A1 | 4/2006 | Tsao et al. | |
| 2007/0133418 A1* | 6/2007 | Agarwal | H04L 69/24 370/236 |
| 2007/0177569 A1 | 8/2007 | Lundby | |
| 2007/0286080 A1* | 12/2007 | Kim | H04W 52/0235 370/236 |
| 2008/0101268 A1 | 5/2008 | Sammour et al. | |
| 2008/0186892 A1* | 8/2008 | Damnjanovic | H04W 52/44 370/311 |
| 2008/0311932 A1 | 12/2008 | Kuo | |
| 2009/0274084 A1 | 11/2009 | Terry et al. | |
| 2013/0258919 A1* | 10/2013 | Damnjanovic | H04W 52/0209 370/311 |
| 2013/0301583 A1 | 11/2013 | Lundby | |

FOREIGN PATENT DOCUMENTS

| | | |
|---|---|---|
| CN | 101351981 A | 1/2009 |
| JP | 2009508372 A | 2/2009 |
| JP | 2009514485 A | 4/2009 |
| KR | 20080070734 A | 7/2008 |
| WO | 2007025138 A2 | 3/2007 |
| WO | 2007052120 A1 | 5/2007 |
| WO | 2007053840 A2 | 5/2007 |
| WO | 2007073118 A1 | 6/2007 |
| WO | 2007078146 A1 | 7/2007 |

OTHER PUBLICATIONS

Nec, "DRX operation and Downlink HARQ interaction", 3GPP TSG-RAN WG2#58bis Tdoc R2-072453, Orlando, USA, Jun. 25-29, 2007, 3 pages.

"3rd Generation Partnership Project; Technical Specification Group Radio Access Network; Physical Channels and Modulation (Release 8)," 3GPP TS 36.211 V1.2.0, Technical Specification, Jun. 2007, 43 pages.

3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 8), 3GPP TS 36.300 V8.1.0, Jun. 2007, 106 pages.

Samsung, "VoIP Support in LTE," 3GPP TSG RAN WG1 Meeting #47bis, R1-070333, Discussion and Decision, Sorrento, Italy, Jan. 15-19, 2007, 4 pages.

LG Electronics; "Consideration on Control Signalling for MIMO-HARQ in E-UTRA Downlink," 3GPP TSG RAN WG1 Meeting #48bis, R1-071556, Mar. 26-30, 2007, 5 pages, St. Julians, Malta.

"DRX parameters in LTE," 3GPP TSG-RAN WG2 Meeting #57bis, R2-071285, Source: Nokia, Discussion and Decision, St. Julians's Malta, Mar. 26-30, 2007, 8 pages.

"Persistent DL Scheduling and VoIP," R2-071368, 3GPP TSG-RAN WG2 #57bis, Source: Alcatel-Lucent, Malta, Mar. 26-30, 2007, pp. 1-5.

Alcatel-Lucent, "Interaction of DRX and Downlink HARQ in LTE," R2-071661, 3GPP TSG RAN WG2 Meeting #58, May 7-11, 2007, Kobe, Japan, 8 pages.

Panasonic, "DRX Handling Issues in LTE," R2-071783, 3GPP TSG RAN WG2 #58, May 7-11, 2007, Kobe, Japan, 4 pages.

"DRX control for LTE_ACTIVE and VoIP," R2-071818, 3GPP TSG-RAN WG2 #58, Source: Ericsson, Discussion and Decision, Kobe, Japan, May 7-11, 2007, 2 pages.

Qualcomm Europe, "DRX Procedure for VoIP," 3GPP TSG-RAN WG2 #58bis, R2-072599, Jun. 25-29, 2007, Orlando, Florida, USA, 2 pages.

"Semi-Persistent Scheduling and DRX Control," R2-072777, 3GPP TSG-RAN-WG2 Meeting #58-bis, Source: Research In Motion Ltd., Orlando, USA, Jun. 25-29, 2007, 6 pages.

"DRX control for VoIP in LTE," 3GPP TSG-RAN WG2#59, R2-073035, Source: Sharp, Discussion and Decision, Athens, Greece, Aug. 20-24, 2007, 4 pages.

Samsung, et al., "PCC Deployment Options," S2-073582, 3GPP TSG SA WG2 Architecture-S2 #59, Aug. 27-31, 2007, Helsinki, Finland, 5 pages.

"3GPP TSG RAN WG2 Archives," XP-002712167, Aug. 2007, 4 pages.

\* cited by examiner

METHOD AND SYSTEM FOR CONTROL OF DISCONTINUOUS RECEPTION (DRX) BY A MOBILE DEVICE IN A WIRELESS COMMUNICATIONS NETWORK

CROSS-REFERENCE TO RELATED APPLICATIONS

This application is a continuation of U.S. patent application Ser. No. 15/620,340, filed on Jun. 12, 2017, which is a continuation of U.S. patent application Ser. No. 14/715,097, filed on May 18, 2015, now U.S. Pat. No. 9,717,113, which is a continuation of U.S. patent application Ser. No. 14/179,356, filed on Feb. 12, 2014, now U.S. Pat. No. 9,066,353, which is a continuation of U.S. patent application Ser. No. 13/012,668, filed on Jan. 24, 2011, now U.S. Pat. No. 8,724,547, which is a divisional application of U.S. patent application Ser. No. 11/837,952, filed on Aug. 13, 2007, now U.S. Pat. No. 7,899,003. All of the aforementioned patent applications are incorporated herein by reference in their entireties.

TECHNICAL FIELD

The invention relates generally to a wireless communications network, like a cellular network, and more particularly to a method for controlling discontinuous reception (DRX) by a network mobile device that is capable of receiving voice-over-internet-protocol (VoIP) data packets.

BACKGROUND

A cellular network is a wireless communications system made up of a number of cells, each served by a fixed transmitter, known as a cell site or base station. Each cell site in the network typically overlaps other cell sites. The most common form of cellular network is a mobile phone (cell phone) system. The base stations are connected to cellular telephone exchanges or "switches", which in turn connect to the public telephone network or another switch of the cellular company.

The 3$^{rd}$ Generation Partnership Project (3GPP) is a worldwide consortium to create a specification for a globally applicable third generation (3G) mobile phone system. 3GPP's plans are currently in development under the title Long Term Evolution (LTE). The 3GPP LTE project is to improve the Universal Mobile Telecommunications System (UMTS) terrestrial radio access mobile phone standard to cope with future requirements. Goals of 3GPP LTE include improving efficiency, lowering costs, improving services, making use of new spectrum opportunities, and better integration with other open standards. The 3GPP LTE technical specification is described in a set of reference documents including 3rd Generation Partnership Project; Technical Specification Group Radio Access Network; Physical Channels and Modulation (Release 8), 3GPP TS 36.211 V0.4.0 (2007-02); and 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8), 3GPP TS 36.300 V8.1.0 (2007-06). In 3GPP LTE (E-UTRA and E-UTRAN) terminology, a base station is called an "eNode-B" (eNB) and a mobile terminal or device is called a "user equipment" (UE).

Mobile devices (UEs) require battery power to operate. One of the goals of E-UTRA and E-UTRAN is to provide power-saving possibilities for the UEs. Discontinuous reception (DRX) is a method used in mobile communications to conserve the battery of the mobile device. The mobile device and the network negotiate phases in which data transfer happens. During other times the mobile device turns its receiver off and enters a low-power state.

In 3GPP LTE, the mobile devices must be able to transmit and receive voice-over-internet-protocol (VoIP) data packets. The VoIP traffic pattern has periodic small data packets at fixed intervals and periodic silence indication (SID) packets. Also, 3GPP LTE uses a hybrid automatic repeat-request (HARQ) method, a variation of the well-known automatic repeat-request ARQ method, to transmit the VoIP packets. HARQ requires an acknowledgment signal (ACK) or negative-acknowledgement signal (NACK) to be sent by the receiver back to the transmitter to indicate that the VoIP packet has been received or not received. If the transmitter receives a NACK, then the VoIP packet is retransmitted.

The unique VoIP traffic pattern and the requirement for ACK/NACK transmissions and VoIP packet retransmissions present special challenges to the use of DRX to minimize power consumption in a mobile device. The mobile device's receiver must be turned on to receive the periodic VoIP packets and SIDs as well as the ACK/NACK signals and retransmitted VoIP packets. What is needed is a system and method for controlling DRX in a mobile device that allows operation with these requirements, but that also minimizes power consumption.

SUMMARY

The invention relates to a method and system for controlling discontinuous reception (DRX) in a mobile device in a wireless communications network that supports voice-over-internet-protocol (VoIP) and that uses an automatic repeat-request (ARQ) method, like a hybrid automatic repeat-request (HARQ) method. The mobile device has autonomous DRX control after initial VoIP traffic setup, meaning that it does not require signaling from the base station to control DRX.

The mobile device activates reception (turns on) to receive the periodic VoIP packets and periodic SID packets and deactivates reception (turns off) after receipt of the periodic VoIP packets and SID packets. If the mobile device transmits a negative-acknowledgement signal (NACK) indicating unsuccessful receipt of a VoIP packet, then it autonomously turns on a predetermined delay time later so that it can receive the first retransmission of the VoIP packet from the base station, where the predetermined delay time is related to the time for the base station to process the NACK and prepare the VoIP packet for retransmission. If the mobile device transmits a second NACK indicating unsuccessful receipt of the first retransmission, then it autonomously turns on a predetermined round-trip-time (RTT) after its last reception so that it can receive the second retransmission of the VoIP packet from the base station, where RTT is the minimum possible time for a VoIP packet to be transmitted, a NACK to be received, and the VoIP packet retransmitted. Values representing the predetermined delay time and the RTT are stored in the mobile device. When the mobile device transmits or retransmits a VoIP packet to the base station, reception is deactivated, but is autonomously activated the predetermined delay time later so that it can receive the ACK or NACK from the base station.

The predetermined delay time may be used to align the uplink (UL) transmissions from the mobile device and the downlink (DL) transmissions from the base station, for example, with the UL transmissions occurring the predetermined delay time before the DL transmissions. The result of this alignment is that if an ACK/NACK is required to be transmitted by the base station when a VoIP packet is scheduled for transmission by the base station, then the VoIP packet and the ACK/NACK are transmitted by the base station in the same transmission time interval (TTI). This avoids the mobile device having to activate reception (turn on) separately to receive the VoIP packets, resulting in power saving at the mobile device.

For a fuller understanding of the nature and advantages of the present invention, reference should be made to the following detailed description taken together with the accompanying figures.

DETAILED DESCRIPTION OF ILLUSTRATIVE EMBODIMENTS

The present invention relates to discontinuous reception (DRX) by mobile devices in wireless communications networks, particularly networks based on Evolved Universal Terrestrial Radio Access (E-UTRA) and Evolved Universal Terrestrial Radio Access Network (E-UTRAN). DRX is employed to take advantage of the characteristics of data being transferred within the network and to conserve the limited battery life of UEs. Although described in relation to E-UTRA and E-UTRAN, the present invention may apply to other networks and to other specifications or standards.

Generally, the DRX parameters, such as the DRX period or cycle, to be applied by a UE may be transmitted via in-band signaling, which is via Layer 2 (L2) data units or protocol data units. The indication of which DRX parameter to be applied may be contained as part of the header format, be part of the payload, and/or both. The DRX processes and features described herein are designed to augment, and not replace, existing DRX processes, e.g., as defined by 3GPP LTE, which include E-UTRA and E-UTRAN.

Figure 1:
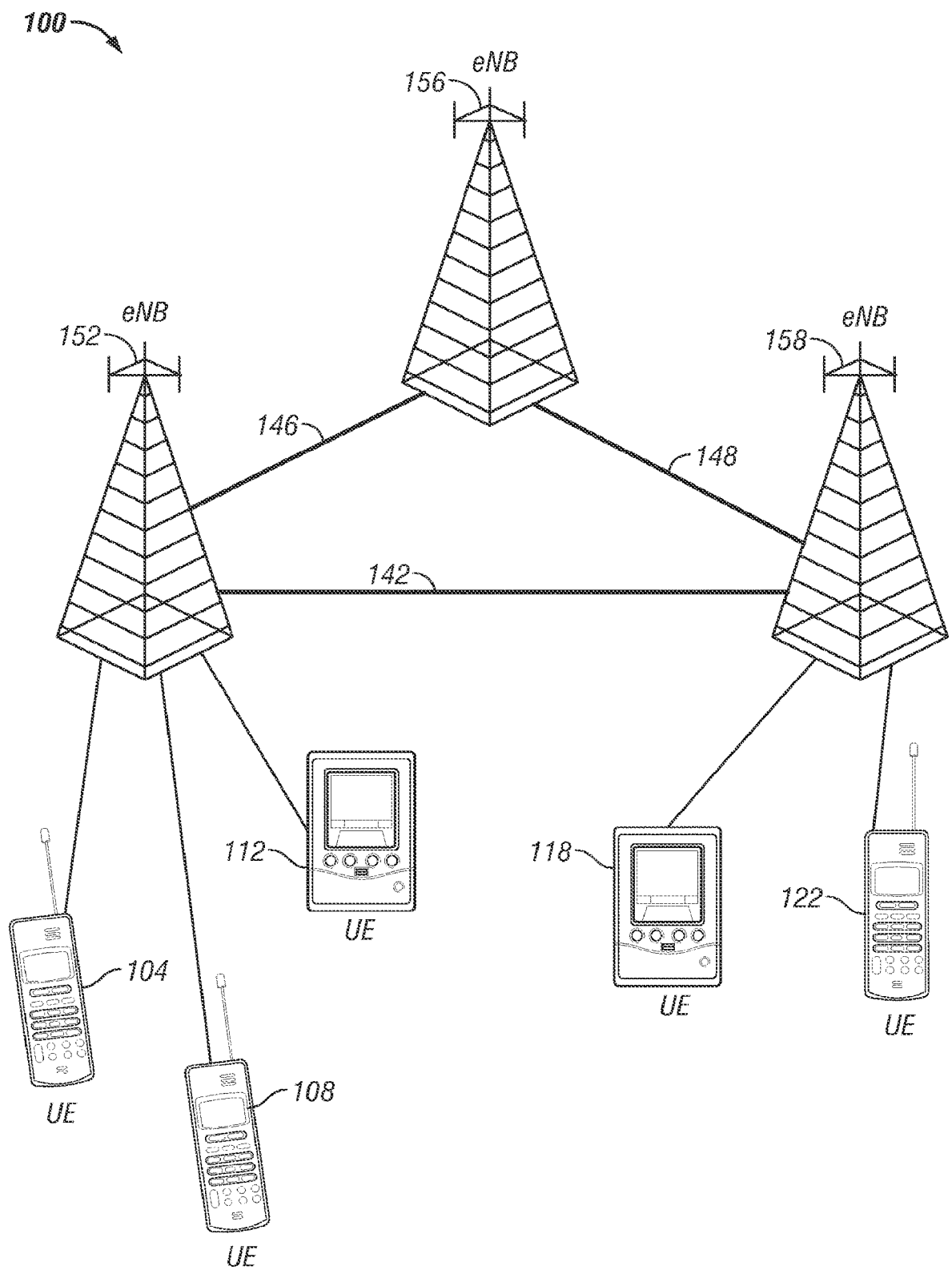
FIG. 1 is a diagram of a wireless communication system like that proposed by 3GPP LTE E-UTRAN and shows three eNBs (base stations) and five UEs (mobile devices).

FIG. 1 is a diagram of a wireless communication system 100 like that proposed by 3GPP LTE E-UTRAN. The system includes a plurality of eNBs (base stations) 152, 156, 158 and a plurality of UEs (mobile phones or terminals), such as mobile phones or terminals 104, 108, 112, 118 and 122, 124. The eNBs 152, 156, 158 are connected to each other via links 142, 146 and 148 and to a central gateway (not shown) that provides connection of the system to the public telephone network.

The eNBs 152, 156, 158, provide the E-UTRA user-plane and control-plane protocol terminations towards the UEs. An eNB is a unit adapted to transmit to and receive data from cells. In general, an eNB handles the actual communication across the radio interface, covering a specific geographical area, also referred to as a cell. Depending on sectoring, one or more cells may be served by one eNB, and accordingly one eNB may support one or more mobile devices (UEs) depending on where the UEs are located.

The eNBs 152, 156, 158 may perform several functions, which may include but are not limited to, radio resource management, radio bearer control, radio admission control, connection mobility control, dynamic resource allocation or scheduling, and/or scheduling and transmission of paging messages and broadcast information. Each eNB 152, 156, 158 is also adapted to determine and/or define the set of DRX parameters, including the initial set, for each UE managed by that eNB, as well as transmit such DRX parameters.

In the example of FIG. 1, there are three eNBs 152, 156, 158. The first eNB 152 manages, including providing service and connections to, three UEs 104, 108, 112. Another eNB 158 manages two UEs 118, 122. Examples of UEs include mobile phones, personal digital assistants (PDAs), computers, and other devices that are adapted to communicate with the mobile communication system 100.

The eNBs 152, 156, 158 may communicate via links 142, 146, 148 with each other, via an X2 interface, as defined within 3GPP LTE. Each eNB may also communicate with a Mobile Management Entity (MME) and/or a System Architecture Evolution (SAE) Gateway, not shown. The communication between an MME/SAE Gateway and an eNB is via an S1 interface, as defined within the Evolved Packet Core specification within 3GPP LTE.

Figure 2:
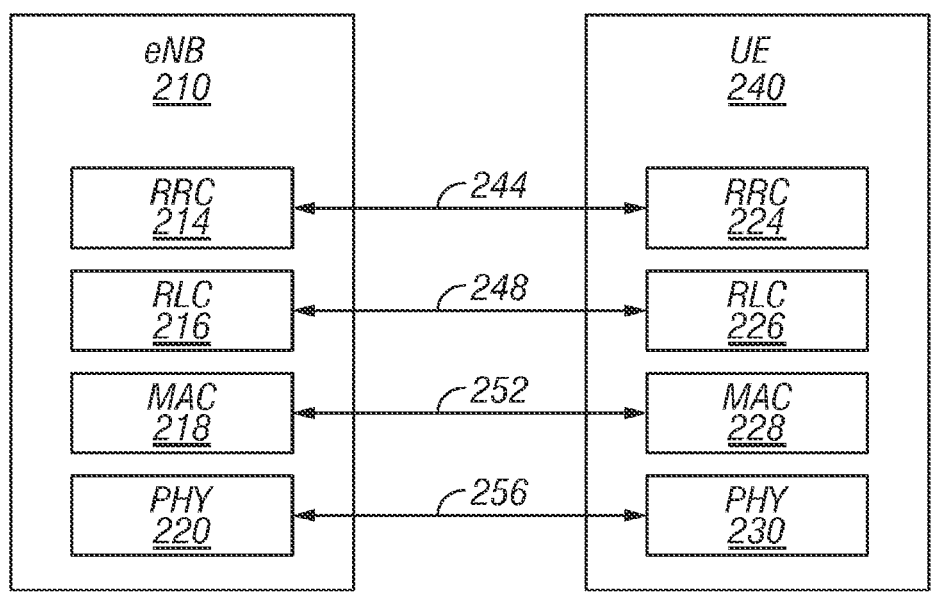
FIG. 2 is a diagram of a portion of the protocol stack for the control plane of a typical eNB and a typical UE.

FIG. 2 is a diagram of a portion of the protocol stack for the control plane of a typical eNB 210 and a typical UE 240. The eNB 210 and UE 240 each typically contains a dedicated processor and/or microprocessor (not shown) and associated memory (not shown). The protocol stacks provide a radio interface architecture between an eNB 210 and a UE 240. The control plane in general includes a Layer 1 (L1) stack comprising a physical PHY layer 220, 230; a Layer 2 (L2) stack comprising a medium access control (MAC) 218, 228 layer and a Radio Link Control (RLC) layer 216, 226; and a Layer 3 (L3) stack comprising a Radio Resource Control (RRC) layer 214, 224. There is another layer referred to as Packet Data Convergence Protocol (PDCP) layer in E-UTRA and E-UTRAN, not shown. The inclusion of the PDCP layer in the control plane has not yet been decided by 3GPP. The PDCP layer is likely to be deemed a L2 protocol stack.

The RRC layer 214, 224 is a L3 radio interface that handles the control plane signaling of L3 between the UEs and E-UTRAN and performs functions for connection establishment and release, broadcast of system information, radio bearer establishment/reconfiguration and releases, RRC connection mobility procedures, paging notification and release, and outer loop power control. The RRC layer also transfers DRX parameters from the eNB 210 to the UE 240, as well as provide RRC connection management. The DRX period (or cycle) being applied by a UE is typically associated with a discontinuous transmission (DTX) period at the eNB side to ensure that data are transmitted by the eNB and received by the UE at the appropriate time periods.

The RLC 216, 226 is a L2 radio interface adapted to provide transparent, unacknowledged, and acknowledged data transfer service. The MAC layer 218, 228 is a radio interface layer providing unacknowledged data transfer service on the logical channels and access to transport channels. The MAC layer 218, 228 is also typically adapted to provide mappings between logical channels and transport channels.

The PHY layer 220, 230 provides information transfer services to MAC 218, 228 and other higher layers 216, 214, 226, 224. Typically the PHY layer transport services are described by their manner of transport. Furthermore, the PHY layer 220, 230 is typically adapted to provide multiple control channels. The UE 240 is adapted to monitor this set of control channels. Furthermore, as shown, each layer communicates with its compatible layer 244, 248, 252, 256. The specifications and functions of each layer are described in detail in the 3GPP LTE specification documents.

In 3GPP LTE, voice-over-internet-protocol (VoIP) will be used to carry voice data, which is the most important application for mobile devices. There are certain unique features of the VoIP traffic pattern, including the use of periodic small data packets (at a fixed interval of one per 20 ms) and periodic silence indication (SID) packets generated by advanced voice coding/decoding (codec) schemes, like adaptive multi-rate (AMR). AMR is an audio data compression scheme optimized for speech coding and was adopted as the standard speech codec by 3GPP. AMR generates a SID packet every 160 ms.

Also, 3GPP LTE uses the hybrid automatic repeat-request (HARQ) method to transmit the VoIP packets. HARQ is a variation of the well-known automatic repeat-request ARQ method, wherein an acknowledgment signal is sent by the receiver to the transmitter to indicate that it has correctly received a data packet. HARQ combines forward error correction and ARQ by encoding the data packet plus error-detection information (such as cyclic redundancy check, CRC) with an error-correction code (such as Reed-Solomon code) prior to transmission. When the coded data packet is received, the receiver first decodes the error-correction code. If the channel quality is good enough, all transmission errors should be correctable and the receiver can obtain the correct packet, so the receiver sends an acknowledgement signal (ACK) to the transmitter. If the channel quality is bad and not all transmission errors can be corrected, the receiver will detect this situation using the error-detection code and the received coded data packet is discarded. A negative-acknowledgement signal (NACK) is then sent from the receiver to the transmitter, which results in a retransmission of the data packet by the transmitter. In the 3GPP LTE proposal, uplink (UL) HARQ retransmissions are synchronous, but downlink (DL) HARQ retransmissions are asynchronous.

For power saving at the mobile devices (UEs), it is important to be able to use DRX during VoIP. One proposal is to use a fixed DRX cycle of 20 ms corresponding to the 20 ms fixed interval of the VoIP packets. However, this approach does not completely take advantage of the unique VoIP traffic pattern. In the present invention DRX is optimized by considering the two-way VoIP traffic characteristics and the interactions between the UL and DL packets and the UL and DL ACK/NACK transmissions required by HARQ.

Figure 3:
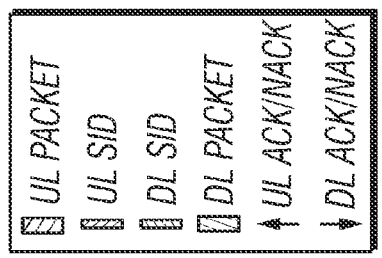
FIG. 3 is an illustration of a typical traffic pattern for two-way voice-over-internet-protocol (VoIP) communications in a wireless communications network.
Figure 3:
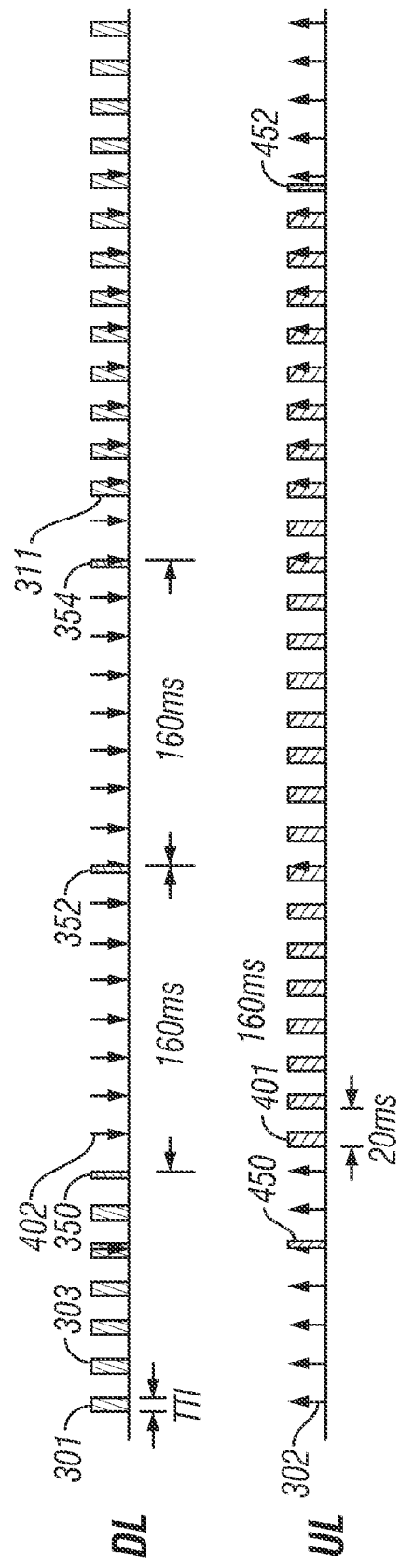

FIG. 3 shows a typical traffic pattern for two-way VoIP communication. For two-way voice communication, it is common that when one party is talking the other party will be listening. Thus, for example, DL speech bursts, sometimes called "talkspurts", will occur at the same time as UL silence periods. This means that the UE will need to be activated for reception or "wake up" to receive DL VoIP packets during DL talkspurts and to receive DL ACK/NACK signals sent in response to UL VoIP packets, even if the DL ACK/NACK signals are sent during DL silence periods.

As shown in FIG. 3, in each direction (DL and UL), there will be talkspurts and silence periods. The voice codec sends out VoIP packets once per 20 ms during talkspurt and SID packets once per 160 ms during silence periods. Each VoIP packet occurs within one transmission time interval (TTI), as shown by typical DL VoIP packet 301. In the example of FIG. 3, a TTI is 1 ms, so the fixed interval between VoIP packets is 20 TTIs. Each DL VoIP packet is followed by a UL acknowledgement signal (ACK) or negative-acknowledgement signal (NACK), which indicate successful or unsuccessful receipt, respectively, of the DL VoIP packet. For example, the DL transmission of VoIP packet 301 is followed by a UL ACK 302. Similarly, the UL transmission of VoIP packet 401 is followed by a DL ACK 402.

FIG. 3 also shows the UL and DL silence periods and their associated UL and DL SIDs. UL SID 450 is the last SID from a previous UL silence period because it is followed by UL VoIP packet 401 which occurs less than 160 ms after UL SID 450. UL SID 452 is the first SID following a UL talkspurt and indicates the beginning of a UL silence period. Similarly, DL SID 350 indicates the start of a DL silence period and is followed by DL SID 352 160 ms later. DL SID 354 is the last SID from this DL silence period because it is followed by DL VoIP packet 311 which occurs less than 160 ms after DL SID 354.

Figure 4:
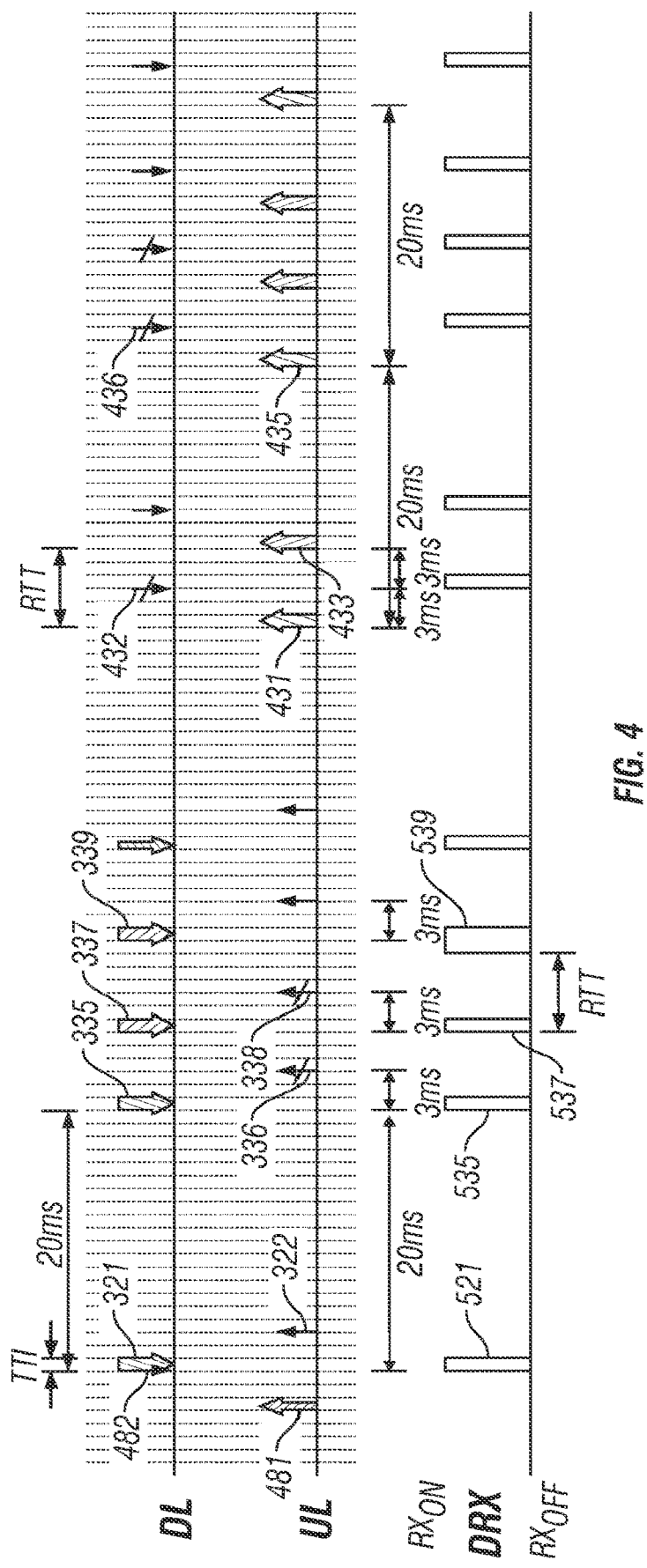
FIG. 4 is an illustration of two-way VoIP communications according to the present invention and shows the alignment of uplink (UL) and downlink (DL) transmissions, with the UL transmissions occurring a predetermined delay time prior to the DL transmissions.
Figure 5:
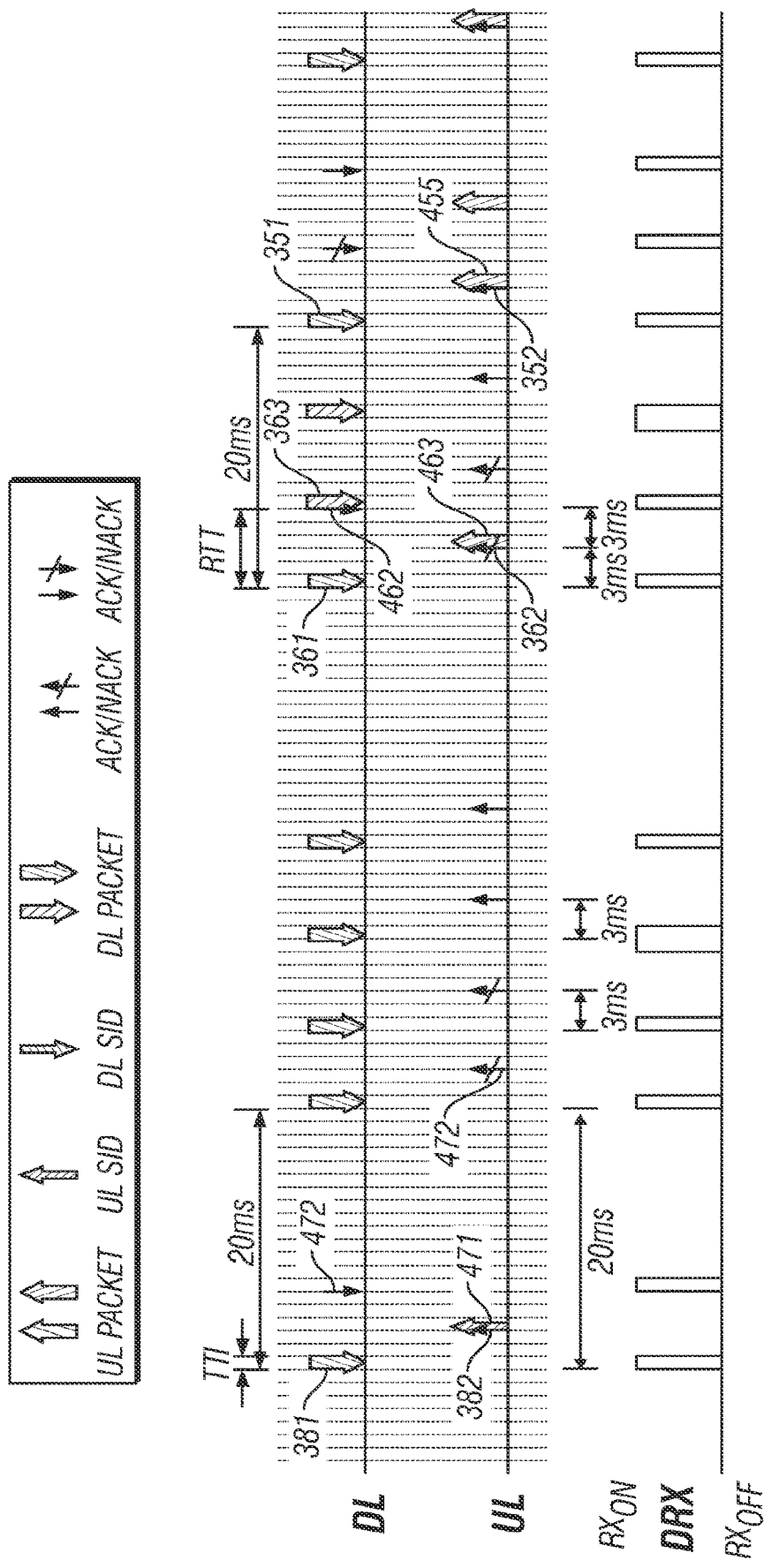
FIG. 5 is an illustration of two-way VoIP communications according to the present invention and shows the alignment of uplink (UL) and downlink (DL) transmissions, with the DL transmissions occurring a predetermined delay time prior to the UL transmissions.

FIGS. 4 and 5 show aspects of the invention on an expanded time scale from the scale depicted in FIG. 3. The HARQ round-trip-time (RTT) is the minimum possible time for a VoIP packet to be transmitted, a NACK to be received, and the packet retransmitted. This is illustrated in FIG. 4 as UL packet 431, DL NACK 432, and retransmitted UL packet 433. In this example, the HARQ RTT is assumed to be 6 ms. Also, the base station (eNB) processing time is the time required for the eNB to process a NACK after it is received and to prepare the VoIP packet for retransmission. In this example it is assumed to be 2 ms. This is illustrated in FIG. 4 for UL NACK 336 and DL packet 337. There is a processing time of 2 ms (2 TTIs) following the end of the TTI containing UL ACK 336 until retransmission of DL packet 337. Thus the time from the start of UL ACK transmission to the retransmission of DL packet 337 is 3 ms, which is referred to as a first delay time corresponding to the eNB delay. Similarly, the UE processing time is assumed to be 2 ms and the total UE delay time is 3 ms, as shown by DL NACK 432 and retransmission of UL packet 433, which is referred to as the second delay time. In this example the first (eNB delay) and second (UE delay) predetermined delay times are the same, i.e., 3 ms.

Prior to the beginning of VoIP transmissions, the eNB notifies the UE that VoIP will be arriving, and the DRX cycle is configured as VoIP packet intervals, as shown in FIG. 4, by DL packets 321, 335 at fixed 20 ms intervals and corresponding "RX On" regions 521, 535 at the same fixed 20 ms intervals. The 20 ms value for the VoIP packet interval and DRX cycle is the value established by 3GPP LTE, but the invention is fully applicable to other intervals, for example a VoIP interval and DRX cycle of 10 ms. However, in the present invention, for DL packet retransmissions and for DL ACK/NACK, no signalling between eNB and UE is required, so that control of DRX transitions (RX On/RX Off) is performed autonomously by the UE. The UE activates reception (RX On in FIGS. 4 and 5) based on information it has locally. This information is the eNB delay time and the HARQ RTT, which are stored within the UE to enable autonomous control of DRX. The eNB may transmit the delay time value to the UE, typically by RRC signalling from the eNB's RRC layer 214 to the UE's RRC layer 224 (FIG. 2), for storage in memory of the UE. Alternatively, the delay time value may be a fixed standard value and thus previously stored in memory of the UE.

After a DL packet has been transmitted, reception by the UE is deactivated (RX Off in FIGS. 4 and 5). This is shown in FIG. 4 by DL packet 321, during which UE reception is activated at RX On region 521, which is then followed immediately by RX Off. If the UE sends a NACK for a DL packet, the UE reception is already deactivated (RX Off), as shown by NACK 336 in FIG. 4. But after transmission of the NACK, at a time period equal to the eNB delay time, UE reception is activated to receive the first retransmission of the DL packet. This is shown in FIG. 4 as a 3 ms time from NACK 336 to RX On region 537. The UE activates reception at region 537 for receipt of the retransmitted DL packet 337. However, if there is a second NACK 338 after retransmission of DL packet 337, then, because DL HARQ is asynchronous, the second DL retransmission 339 can occur anytime after HARQ RTT. Thus the UE activates reception (RX On) at region 539 a time period equal to the RTT after the first DL retransmission 337 and reception remains activated until receipt of the second retransmission. In this example in FIG. 4, the second DL retransmission 339 occurs 7 ms after the first DL retransmission 337. The present invention thus allows autonomous DRX control for the 3GPP LTE proposal for asynchronous HARQ DL transmissions, but is also fully applicable if the HARQ DL transmissions are synchronous. In 3GPP LTE, there are only two HARQ retransmissions of a VoIP packet; if the second retransmission fails, there are no additional retransmissions of the packet.

One aspect of the present invention is that if an ACK/NACK is required to be transmitted when a VoIP packet is scheduled for transmission, then the VoIP packet and the ACK/NACK are transmitted in the same TTI. One example of this is shown in FIG. 5 by UL VoIP packet 455 that is transmitted in the same TTI as ACK 352, with ACK 352 being in response to DL packet 351. The transmission of a ACK/NACK in the same TTI as a VoIP packet is the result of the special alignment of the UL and DL transmissions in the manner as shown in FIGS. 4 and 5, using the known values for eNB delay time (FIG. 4) and UE delay time (FIG. 5).

Referring first to FIG. 4, the UL transmissions occur 2 ms before the DL transmissions, as shown by UL SID 481 occurring 2 ms prior to DL packet 321. This 2 ms (which is 2 TTIs in this example) corresponds to the eNB delay time and is known locally by the UE, as explained above. The UE activates reception (RX On) 2 ms after the UL SID 481 in order to receive the DL ACK 482. Because the UE has reception activated, and because the DL transmissions are aligned by this 2 ms shift with the UL transmissions, the DL packet 321 is received in the same TTI as ACK 482. Because UL HARQ is synchronous, these two DL transmissions (a DL packet and a DL ACK/NACK) will always occur in the same TTI. This avoids the UE having to activate reception separately to receive the DL packets, resulting in power saving at the UE. The alignment of the DL and UL transmissions by this shift corresponding to the eNB delay time can be performed by the eNB by scheduling the transmissions according to this alignment at the time of VoIP traffic setup.

Referring next to FIG. 5, the DL transmissions occur 2 ms before the UL transmissions, as shown by DL packet 381 occurring 2 ms prior to UL SID 471. This 2 ms (which is 2 TTIs in this example) corresponds to the UE delay time and is known locally by the UE. This allows UL packets to be sent in the same TI with the UL ACK/NACK, as shown by UL packet 463 and UL NACK 362, with UL NACK 362 being in response to DL packet 361. Also, if a DL retransmission is sent within the HARQ RTT, then this 2 ms alignment will also allow DL packet retransmissions to be sent in the same TI as the DL ACK/NACK. This is shown by DL retransmission packet 363 and DL ACK 462, with DL ACK 462 being in response to UL packet 463.

There may be infrequent occasions where large non-VoIP data packets need to be transmitted by the eNB, for example signalling packets used for control information. On such occasions these data packets cannot be transmitted within one TI, so the autonomous DRX control of the UE described above would need to be temporarily suspended to receive the control information.

As mentioned above, the base stations (eNBs) and mobile devices (UEs) have dedicated processors and/or microprocessors and associated memory. Thus the above-described method may be implemented in software modules or components of executable code stored in memory in the base stations and mobile devices. The dedicated processors and/or microprocessors perform logical and arithmetic operations based on the program instructions stored in memory to perform the method of this invention.

While the present invention has been described above for VoIP, which has a traffic pattern characterized by periodic packets, it is fully applicable to applications other than VoIP where the traffic patterns are characterized by small periodic packets. Also, the present invention is applicable to other wireless communications networks, like those based on the IEEE 802.16m standards.

While the present invention has been particularly shown and described with reference to the preferred embodiments, it will be understood by those skilled in the art that various changes in form and detail may be made without departing from the spirit and scope of the invention. Accordingly, the disclosed invention is to be considered merely as illustrative and limited in scope only as specified in the appended claims.

What is claimed is:

1. An apparatus comprising:
   a storage medium comprising instructions; and
   one or more processors in communication with the storage medium, wherein the one or more processors execute the instructions to perform operations comprising:
      starting a predefined timer in a transmission time interval (TTI) in which downlink data in a first transmission is sent to a terminal device, wherein a duration of the predefined timer is a round-trip time (RTT),
      receiving a negative-acknowledgement signal (NACK) from the terminal device, and
      performing, after expiration of the predefined timer, a second transmission of the downlink data to the terminal device, wherein the second transmission is asynchronous.

2. The apparatus according to claim 1, wherein the operations comprise:
   performing the second transmission to the terminal device after several TTIs passing from a TTI in which the predefined timer expires.

3. The apparatus according to claim 1, wherein the duration of the predefined timer is locally stored.

4. The apparatus according to claim 1, wherein the downlink data is voice-over-internet-protocol (VoIP) data.

5. The apparatus according to claim 1, wherein the first transmission is a first retransmission of the downlink data and the second transmission is a second retransmission of the downlink data.

6. The apparatus according to claim 1, wherein uplink data is received from the terminal device together with the NACK.

7. The apparatus according to claim 1, wherein the operations comprise maintaining, when the downlink data cannot be transmitted within one TTI, the transmission for the downlink data to transmit the downlink data.

8. A method, comprising:
starting a predefined timer in a transmission time interval (TTI) in which downlink data in a first transmission is sent to a terminal device, wherein a duration of the predefined timer is a round-trip time (RTT),
receiving a negative-acknowledgement signal (NACK) from the terminal device, and
performing, after expiration of the predefined timer, a second transmission of the downlink data to the terminal device, wherein the second transmission is asynchronous.

9. The method according to claim 8, further comprising:
performing the second transmission to the terminal device after several TTIs passing from a TTI in which the predefined timer expires.

10. The method according to claim 8, wherein the duration of the predefined timer is locally stored.

11. The method according to claim 8, wherein the downlink data is voice-over-internet-protocol (VoIP) data.

12. The method according to claim 8, wherein the first transmission is a first retransmission of the downlink data and the second transmission is a second retransmission of the downlink data.

13. The method according to claim 8, wherein uplink data is received from the terminal device together with the NACK.

14. The method according to claim 8, comprising maintaining, when the downlink data cannot be transmitted within one TTI, the transmission for the downlink data to transmit the downlink data.

15. A non-transitory computer-readable storage medium comprising instructions that are configured to, when executed by one or more processors, cause the one or more processors to perform operations comprising:
starting a predefined timer in a transmission time interval (TTI) in which downlink data in a first transmission is sent to a terminal device, wherein a duration of the predefined timer is a round-trip time (RTT),
receiving a negative-acknowledgement signal (NACK) from the terminal device, and
performing, after expiration of the predefined timer, a second transmission of the downlink data to the terminal device, wherein the second transmission is asynchronous.

16. The non-transitory computer-readable storage medium according to claim 15, wherein the operations further comprise:
performing the second transmission to the terminal device after several TTIs passing from a TTI in which the predefined timer expires.

17. The non-transitory computer-readable storage medium according to claim 15, wherein the duration of the predefined timer is locally stored.

18. The non-transitory computer-readable storage medium according to claim 15, wherein the downlink data is voice-over-internet-protocol (VoIP) data.

19. The non-transitory computer-readable storage medium according to claim 15, wherein the first transmission is a first retransmission of the downlink data and the second transmission is a second retransmission of the downlink data.

20. The non-transitory computer-readable storage medium according to claim 15, wherein uplink data is received from the terminal device together with the NACK.

21. The non-transitory computer-readable storage medium according to claim 15, wherein the operations comprise maintaining, when the downlink data cannot be transmitted within one TTI, the transmission for the downlink data to transmit the downlink data.

* * * * *

UNITED STATES PATENT AND TRADEMARK OFFICE
CERTIFICATE OF CORRECTION

PATENT NO. : 10,772,149 B2  
APPLICATION NO. : 16/196609  
DATED : September 8, 2020  
INVENTOR(S) : Shugong Xu Page 1 of 1

It is certified that error appears in the above-identified patent and that said Letters Patent is hereby corrected as shown below:

On the Title Page

Please insert --(73) Assignee: Huawei Technologies Co., Ltd., Shenzhen (CN)--.

Signed and Sealed this  
Eighth Day of December, 2020

Andrei Iancu  
*Director of the United States Patent and Trademark Office*